(12) United States Patent
Ng et al.

(10) Patent No.: US 8,984,476 B2
(45) Date of Patent: Mar. 17, 2015

(54) TARGET APPLICATION CREATION

(75) Inventors: Tinny Mei Chi Ng, Markham (CA); Louise Suzanne Elliott, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 13/104,152

(22) Filed: May 10, 2011

(65) Prior Publication Data

US 2011/0321004 A1 Dec. 29, 2011

(51) Int. Cl.
 G06F 9/44 (2006.01)
(52) U.S. Cl.
 CPC .......................................... *G06F 8/20* (2013.01)
 USPC .......................................... 717/106; 717/108
(58) Field of Classification Search
 None
 See application file for complete search history.

(56) References Cited

U.S. PATENT DOCUMENTS

| | | | |
|---|---|---|---|
| 7,496,888 B2 | 2/2009 | Sanjar | |
| 7,996,855 B2 | 8/2011 | Heist et al. | |
| 8,131,666 B2 | 3/2012 | O'Brien et al. | |
| 8,606,804 B2 | 12/2013 | Merz et al. | |
| 2004/0015822 A1* | 1/2004 | Linton et al. | 717/104 |
| 2004/0143812 A1 | 7/2004 | Bernstein | |
| 2005/0044527 A1 | 2/2005 | Recinto | |
| 2005/0114832 A1 | 5/2005 | Manu | |
| 2005/0257193 A1 | 11/2005 | Falk | |
| 2006/0106774 A1 | 5/2006 | Cohen et al. | |
| 2006/0242582 A1 | 10/2006 | Swanson et al. | |
| 2007/0266054 A1 | 11/2007 | Stephens et al. | |
| 2008/0040672 A1 | 2/2008 | Appleyard et al. | |
| 2008/0086527 A1 | 4/2008 | Sposetti et al. | |
| 2008/0154690 A1 | 6/2008 | Mommeja | |
| 2009/0144719 A1* | 6/2009 | Pazdziora | 717/171 |
| 2010/0274620 A1 | 10/2010 | Upadhyaya et al. | |

FOREIGN PATENT DOCUMENTS

CA 2501114 A1 10/2003

OTHER PUBLICATIONS

Murth, Johannes, "Visualization and Manipulation of Diagrams on The Web", 2009, pp. 1-103, downloaded from: http://publik.tuwien.ac.at/files/PubDat_184511.pdf.

(Continued)

*Primary Examiner* — Qamrun Nahar
(74) *Attorney, Agent, or Firm* — Brevetto Law Group (57) ABSTRACT

An illustrative embodiment of a computer-implemented process for target application creation receives a representation of a logical topology diagram for an application architecture to form a source input, locates part type information in a part type dictionary using the source input, locates application parts in an application parts repository for each located part type and composes a subset of identified parts. The computer-implemented process further determines whether integration dependencies are met and responsive to a determination that integration dependencies are met, consolidates parts into an application structure, determines whether to exclude parts and responsive to a determination to not exclude parts, builds a target application.

20 Claims, 9 Drawing Sheets

(56) References Cited

OTHER PUBLICATIONS

Pertet et al., "Handling Cascading Failures: The Case for Topology—Aware Fault-Tolerance", pp. 1-6, Carnegie Mellon University, Pittsburgh, PA, downloaded from: http://www.ece.cmu.edu/~mead/dsn-hotdep-2005.pdf.

Marechaux, Jean-Louis, "Developing a J2EE Architecture with Rational Software Architect Using the Rational Unified Process", WEB, 2005, pp. 1-18, IBM, Canada, downloaded from: http://www.ibm.com/developerworks/rational/library/05/0816_Louis/.

Ashmed, Haseeb, UML Based Automated Code Generation, power point, 2007, slides 1-27, IEEE Computer Society Phoenix—Motorola Inc, USA, downloaded from: http://www.google.co.in/#hl=en&q=%22architecture+diagram%22++and+auto+and+program+and+(generate+or+write)&start=10&sa=N&fp=6e67f0911d014d29.

Jasco; "International Insights—Thoughts about Federated Searching"; Information Today, vol. 21, No. 9, Oct. 2004, p. 17-24 (Original document not available; the copy provided is from https://archive.org/web/web.php (WaybackMachine)).

Linoski et al.; "Federated Search 101"; Library Journal, Jul. 2008, pp. 17 and 20.

\* cited by examiner

System
300

TARGET APPLICATION CREATION

CROSS-REFERENCE TO RELATED APPLICATIONS

The subject application hereby claims the benefit of priority under 35 U.S.C. 119 and 37 C.F.R. §1.55 to prior Canadian Patent Application Number 2707251, filed on Jun. 29, 2010, and entitled, "Target Application Creation" a certified copy of which has been submitted herewith.

BACKGROUND

1. Technical Field

This disclosure relates generally to the development of application software in a data processing system and more specifically to programmatic determination of elements for a target application in a data processing system.

2. Description of Related Art

When composing a target application, for example a sample application to demonstrate a proof of concept, even from existing parts, work is required to transition from a proposed architecture of the application to a set of products and interactions the target sample application should demonstrate. The work of performing the transition is typically a labor-intensive and error-prone task.

Further, when the correct set of products is represented in the target application, there may still be further considerations. Consider an example in which a target application uses the correct products but fails to demonstrate business value of the proposed solution. In this example a proposed solution includes use of an Enterprise JavaBean™ (EJB) on a web application server accessing a native database management system. A target application comprises a servlet on a web application server accessing a native database management system. This seems like a match based on the products involved, but actually, the combination does not demonstrate business value. A client, to whom this solution is demonstrated, might very reasonably request to see a demonstration of an EJB accessing the native database management system.

The configuration of the proposed solution may then have to be modified to achieve the requested demonstration. Again the manual process of transitioning from a proposed architecture of the application to a set of products and interactions the target sample application should demonstrate must be used. An approach that would reduce error and shorten the time required to create a target application to support a proposal is required. An improved solution could increase success in software proposals by convincing clients of the validity of a proposed solution in a shorter time without requiring extra skills to be learned by or drafted into the proposing sales team.

SUMMARY

According to one embodiment, a computer-implemented process for target application creation receives a representation of a logical topology diagram for an application architecture to form a source input, locates part type information in a part type dictionary using the source input, locates application parts in an application parts repository for each located part type and composes a subset of identified parts. The computer-implemented process further determines whether integration dependencies are met and responsive to a determination that integration dependencies are met, consolidates parts into an application structure, determines whether to exclude parts and responsive to a determination to not exclude parts, and builds a target application.

According to another embodiment, a computer program product for target application creation comprises a computer recordable-type media containing computer executable program code stored thereon. The computer executable program code comprises computer executable program code for receiving a representation of a logical topology diagram for an application architecture to form a source input, computer executable program code for locating part type information in a part type dictionary using the source input, computer executable program code for locating application parts in an application parts repository for each located part type, computer executable program code for composing a subset of identified parts, computer executable program code for determining whether integration dependencies are met, computer executable program code responsive to a determination that integration dependencies are met, for consolidating parts into an application structure, computer executable program code for determining whether to exclude parts and computer executable program code responsive to a determination to not exclude parts, for building a target application.

According to another embodiment, an apparatus for target application creation comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a representation of a logical topology diagram for an application architecture to form a source input, locate part type information in a part type dictionary using the source input, locate application parts in an application parts repository for each located part type, compose a subset of identified parts, determine whether integration dependencies are met, responsive to a determination that integration dependencies are met, consolidate parts into an application structure, determine whether to exclude parts, responsive to a determination to not exclude parts, build a target application.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
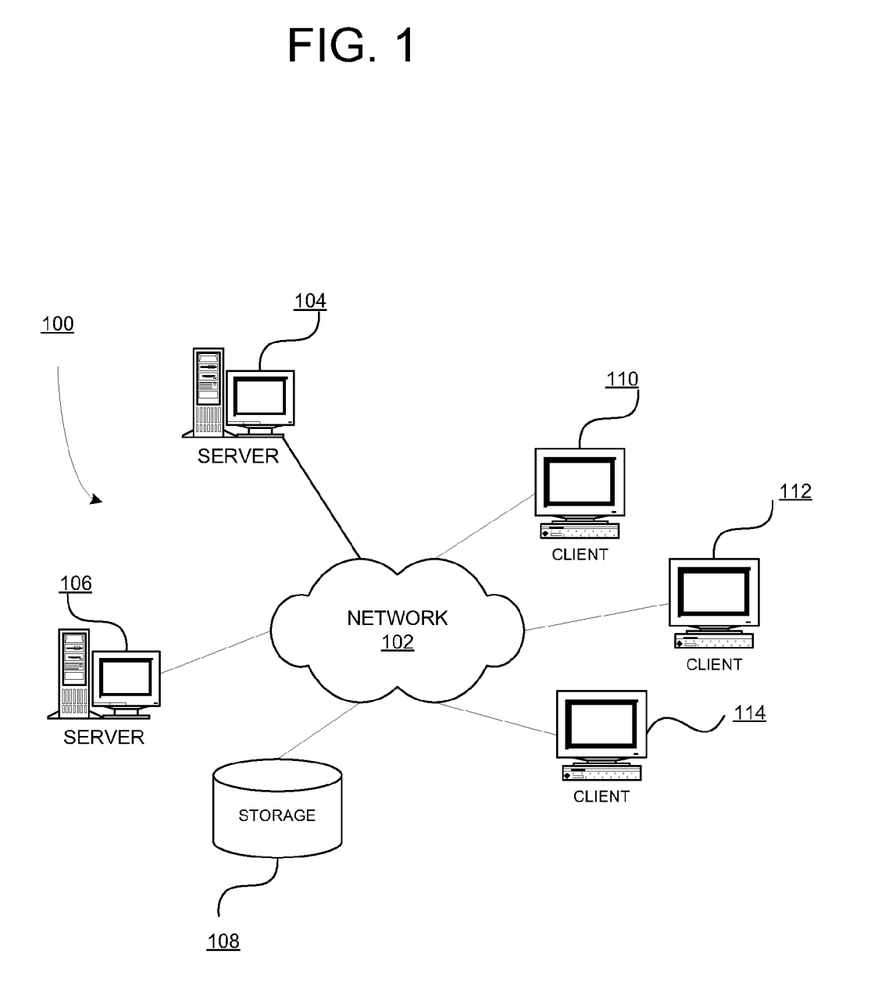
FIG. 1 is a block diagram of a network of data processing systems operable for various embodiments of the disclosure.
Figure 2:
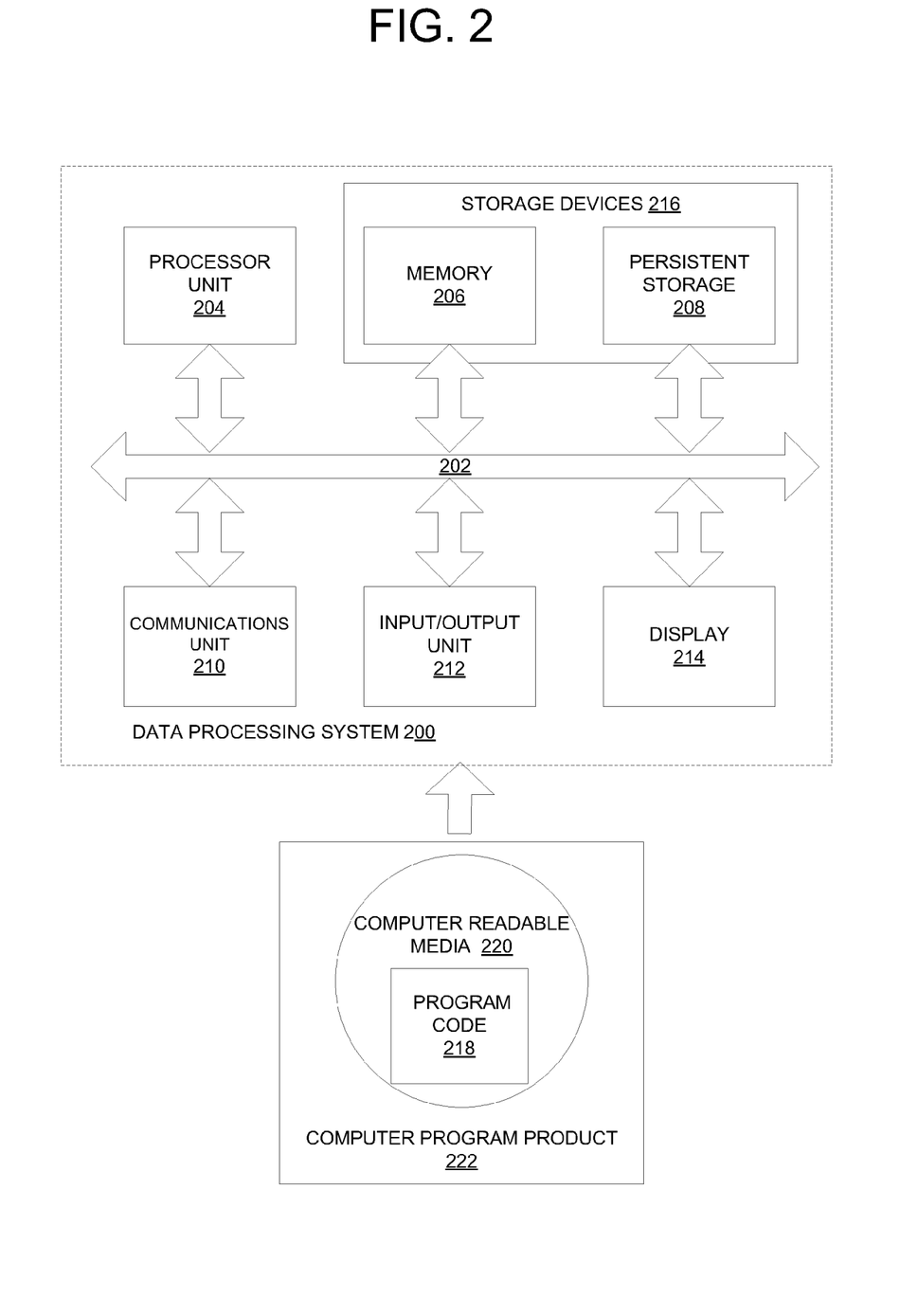
FIG. 2; is a block diagram of a data processing system operable for various embodiments of the disclosure.

With reference now to the figures and in particular with reference to FIGS. 1-2, diagrams of data processing environments are provided in which illustrative embodiments may be implemented. It should be appreciated that FIGS. 1-2 are given as examples only and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2 a block diagram of a data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, computer executable instructions or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a storage media of persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

According to an illustrative embodiment using data processing system 200 of FIG. 2 as an example, processor unit 204 executes a computer-implemented process for target application creation. Processor unit 204 receives a representation of a logical topology diagram for an application architecture to form a source input through communications unit 210 using network 102 of network of data processing systems 100 of FIG. 1. Processor unit 204 locates part type information in a part type dictionary using the source input, locates application parts in an application parts repository, maintained in storage devices 216, for each located part type and composes a subset of identified parts. Processor unit 204 further determines whether integration dependencies are met and responsive to a determination that integration dependencies are met, consolidates parts into an application structure, determines whether to exclude parts and responsive to a determination to not exclude parts, builds a target application.

In an alternative embodiment, program code 218 of FIG. 2 containing the computer-implemented process may be stored within computer readable media 220 as computer program product 222. In another illustrative embodiment, the process for target application creation may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 3:
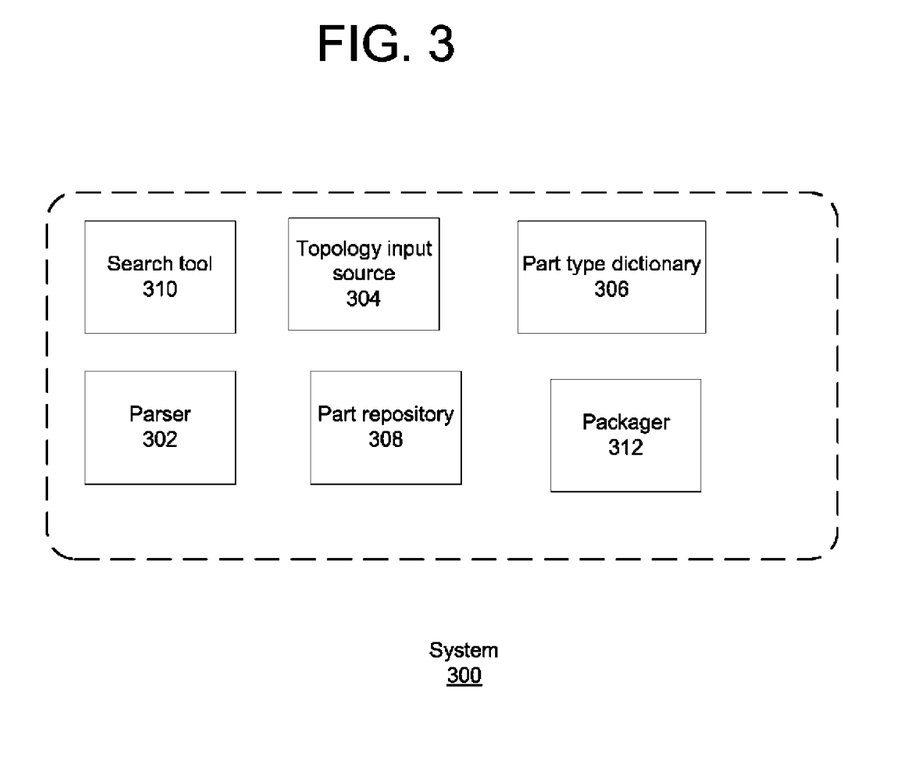
FIG. 3; is a block diagram of components of a target application creation system in accordance with various embodiments of the disclosure.

With reference to FIG. 3 a block diagram of components of a target application creation system in accordance with various embodiments of the disclosure is presented. System 300 is supported by components of a typical data processing system, for example, data processing system 200 of FIG. 2.

System 300 comprises a number of components including parser 302, topology input source 304, part type dictionary 306, part repository 308, search tool 310 and packager 312. System 300 provides a convenient combination of components to manage and maintain the components of a target application creation system.

Parser 302, in the illustrative embodiments, is an extensible markup language (XML) parser typically available from software vendors or other sources having a capability to parse and process defined extensible markup language statements. The defined extensible markup language statements are provided as topology input source 304. Topology input source 304 is typically an XML representation of a unified modeling language-based definition of a logical topology of a target application. When topology input source 304 is not in an XML format a transformation may be required to prepare the topology definitions for processing by parser 302.

One or more repositories in the form of part type dictionary 306 and part repository 308 provide a capability to store and maintain information relating to type of parts or elements of the target application and ready to use parts from which to create the target application. Part type dictionary 306 provides a capability to store, maintain and retrieve information regarding functional attributes of parts. For example, a part type may be expressed as a business rule used by a business rule manager implemented in a process server product. Part repository 308 provides a capability to store, maintain and retrieve parts from which applications may be assembled. The parts found within part repository 308 may be in a ready to use state or a not ready to use state depending upon the specifics of the part and an interrelationship with other selected parts. For example, a part may be supplied as a configurable addition to a base element, in which case the combination may have to be processed in a separate installation process.

Search tool 310 provides a capability to locate part type information and parts using information from topology input source 304 in part type dictionary 306 and part repository 308. Search tool 310 may be a typical search mechanism capable of identifying and retrieving elements from a set of elements in a repository such as part type dictionary 306 and part repository 308.

Packager 312 provides a capability to create a target application from a set of parts provided using the process of system 300. Packager 312 may also assemble rather than aggregate the provided parts. The result may be a target application that is ready to use or the target application may require additional processing to be placed in a condition for use. Additional processing typically includes processing including configuration of elements or combinations or compilation of elements or combinations.

System 300 provides a capability to programmatically read an architecture, as described by a software information technology architect, and generate a target application directly from the architecture documentation, eliminating the tedium and potential errors introduced in the previously used manual process.

For example, a process using system 300 uses an architecture diagram, known as a logical topology, to derive what parts and interactions between the parts is required to demonstrate the business value of a proposed software product to a client. The process enables an architect or other user to prove the business value of a proposed target software product to a client quickly and reliably.

Figure 4:
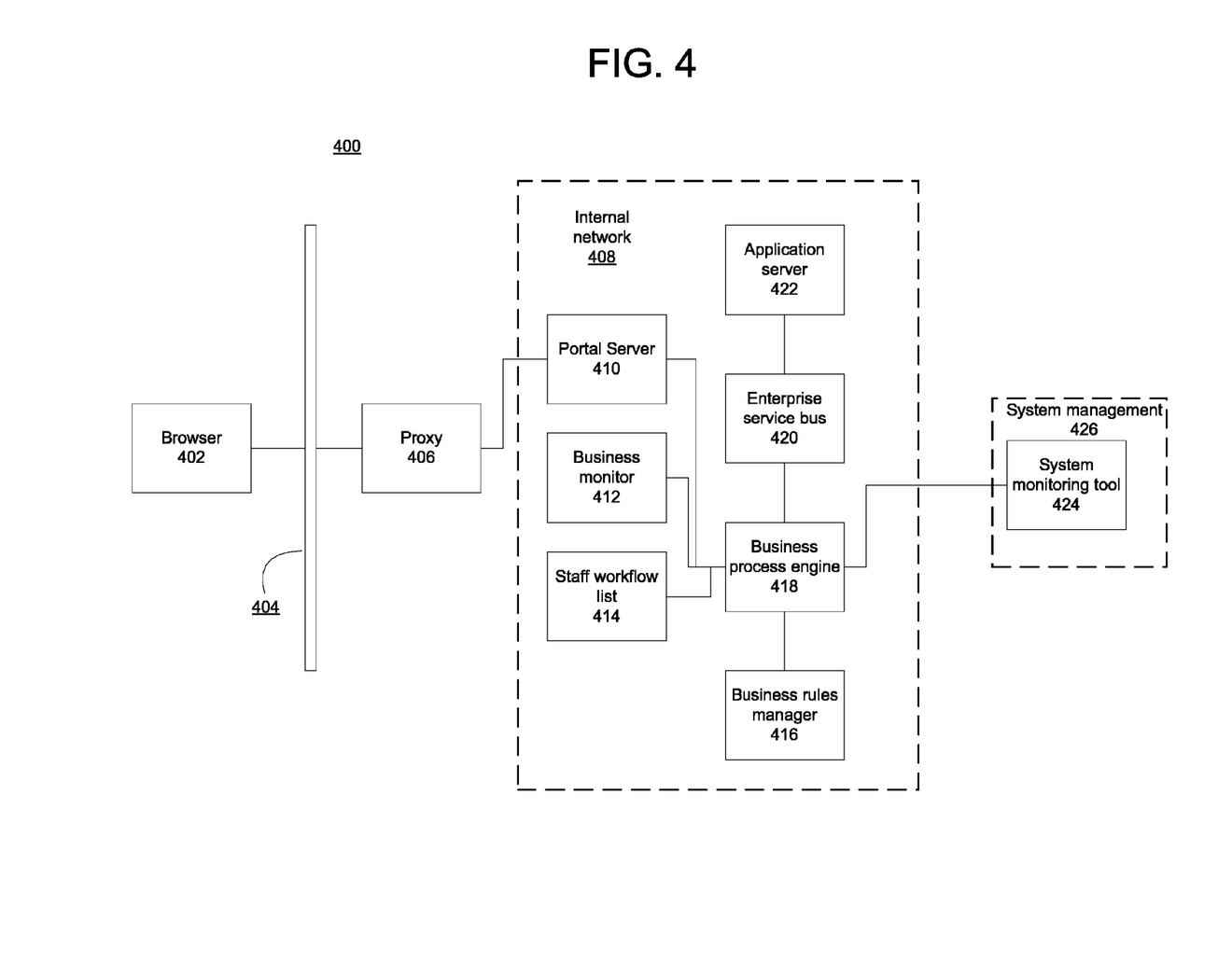
FIG. 4; is a block diagram of high-level view of logical topology of a target application system used in the target application creation system of FIG. 3 in accordance with various embodiments of the disclosure.

With reference to FIG. 4 a block diagram of high-level view of logical topology of a target application system used in the target application creation system of FIG. 3 in accordance with various embodiments of the disclosure is presented. System 400 is an example of a high-level view of an overall application logical topology.

A user interface is provided in browser 402 with network access to application services managed through firewall 404 further through proxy 406. Use of firewall 404 further through proxy 406 is optional and shown to demonstrate the proposed system operates within a typical networking environment.

Internal network 408 provides a capability for the components comprising a target application to operate and communicate. Internal network 408 may comprise a server, such as server 422, which may be one or more servers in support of the applications of an enterprise. Portal server 410 directs communications from proxy 406 through internal network 408 to business process engine 418. Business process engine 418 further communicates with business monitor 412 to receive notification of business activities and with staff workflow list 414 to receive staffing information. Business rules manager 416 manages and maintains business rules used in processing business events associated with the applications. Enterprise service bus 420 provides a connection between application server 422 and the previously described elements.

System monitoring tool 424, outside internal network 408 in this example, is contained within an element of system management 426. System monitoring is performed to manage the overall operational aspects, including resource utilization, of system 400 rather than specific events associated with an application which are typically better handled by elements of internal network 408.

Figure 5:
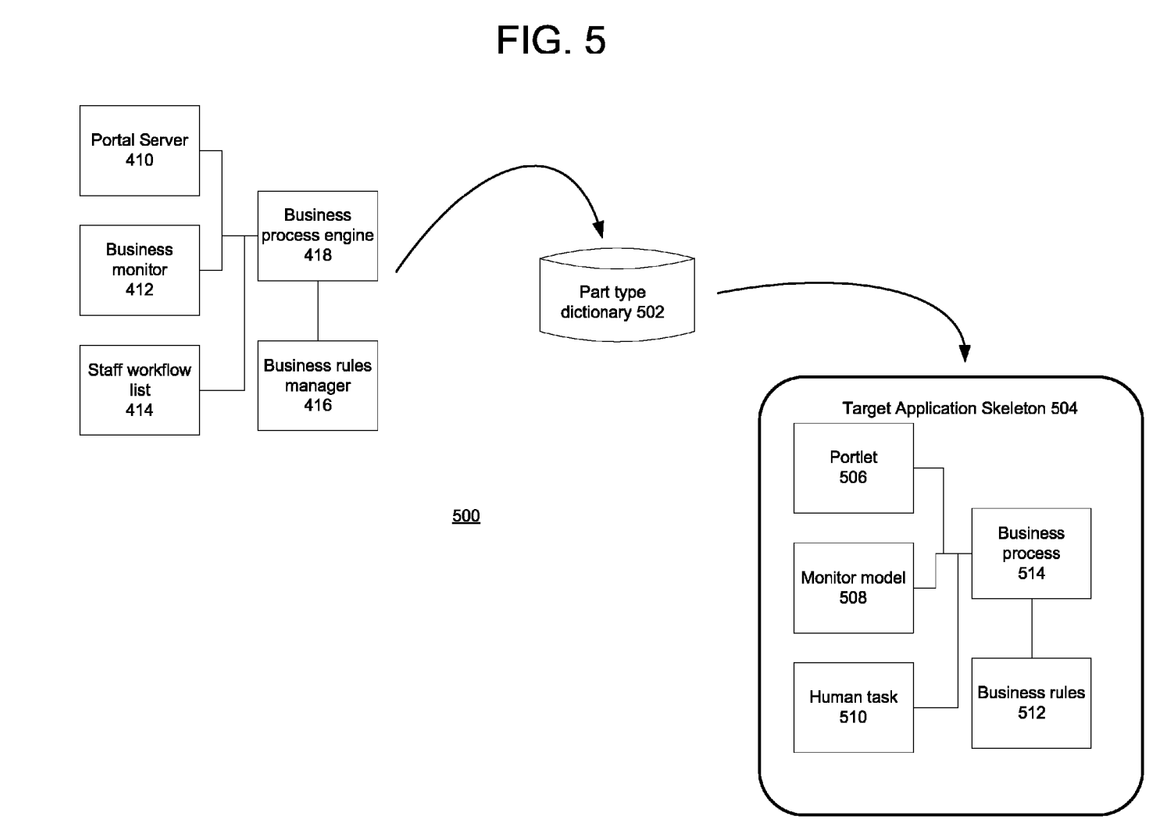
FIG. 5; is a block diagram of a process of determining a target application skeleton using the logical topology of FIG. 4 in accordance with various embodiments of the disclosure.

With reference to FIG. 5 a block diagram of a process of determining a target application skeleton using the logical topology of FIG. 4 in accordance with various embodiments of the disclosure is presented. Process 500 is an example of using certain logical topology information of system 400 of FIG. 4 to identify part type information to define a target application skeleton.

Topology information representative of a target system, such as topology input source 304 of FIG. 3, in an XML format is processed to identify new or extended logical components such as portal server 410, business monitor 412, staff workflow list 414, business rules manager 416 and business process engine 418 all of FIG. 4. The topology information provides information describing particular logical functional elements needed in an application. Part type dictionary 502 provides a capability to search for and locate the new or extended logical component and product pairs as defined in a diagram associated with topology input source 304 of FIG. 3. Each pair of logical component and product typically maps to one or more part types in part type dictionary 502. One example of content of part type dictionary 502 is provided in FIG. 6.

Target application skeleton 504 comprises a number of elements based on the part types and connections between logical components of the topology information processed. For example, selected logical component and product pairs from the topology information are used to identify part types in part type dictionary 502. The output of the part type lookup provides target application skeleton 504 comprising portlet 506, monitor model 508, human task 510, business rules 512 and business process 514. The application skeleton provides a selection of needed part types.

Figure 6:
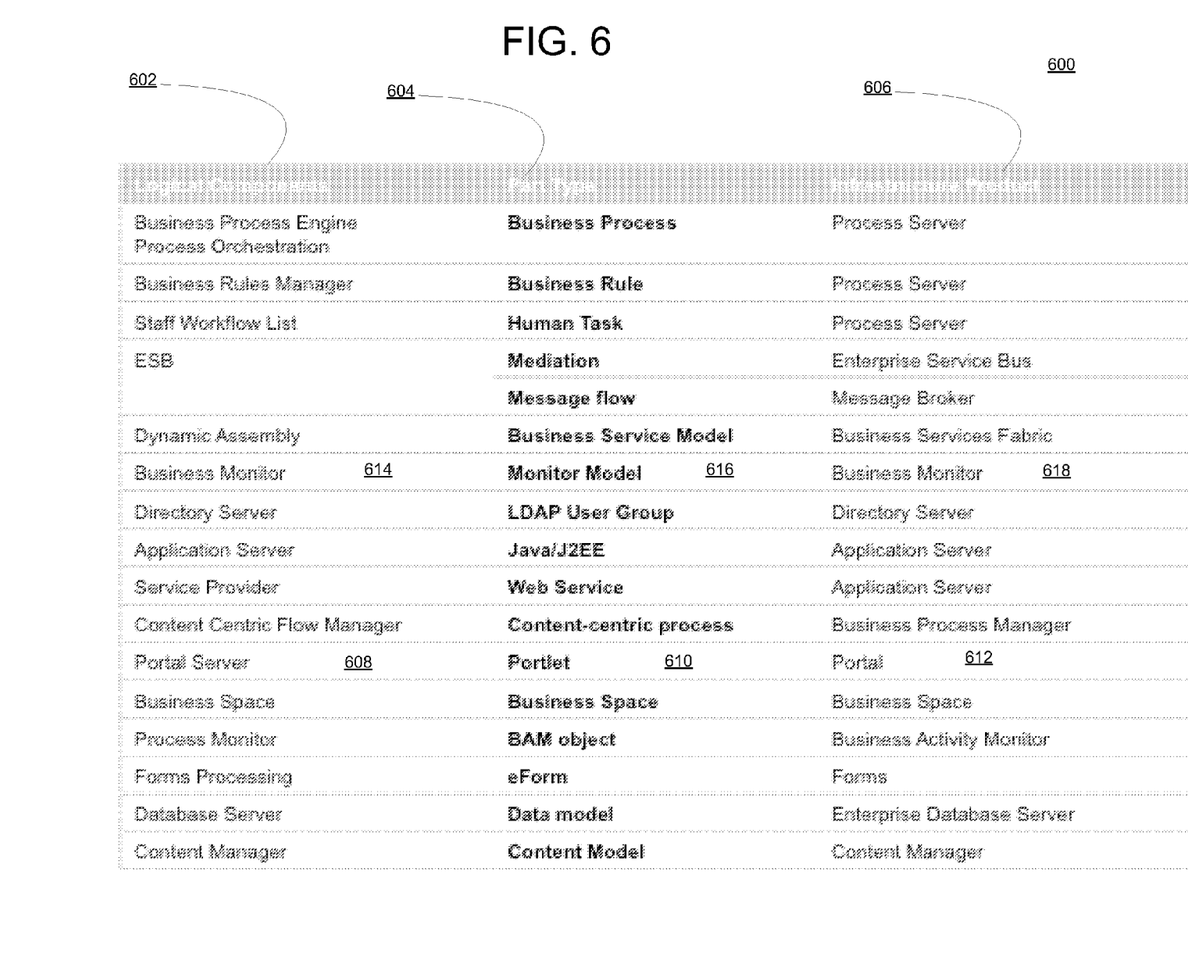
FIG. 6; is a tabular representation of a relationship of a part type for a product used for an identified logical component of the target application skeleton of FIG. 5 in accordance with various embodiments of the disclosure.

With reference to FIG. 6 a tabular representation of content of a part type dictionary in accordance with various embodiments of the disclosure is presented. Content 600 is an example of a set of relationships of a part type for a product used for an identified logical component of the target application skeleton of FIG. 5. Content 600 depicts relationships defined between logical components 602 of application architecture and respective infrastructure product 606 of the components. In addition the relationship is used to identify an associated part type 604 with the specified relationship to form logical component and product pairs.

For example, a logical component of portal server 608 is associated with an infrastructure product of portal 612. The relationship further identifies part type of portlet 610. In operation, portal 612 would specify an element in the form of a usable product, such as a vendor provided portal solution. In another example related to the example of FIG. 5, the logical component of business monitor 614 is associated with an infrastructure product of business monitor 618. The relationship further identifies a part type of monitor model 616. As in the previous example, business monitor 618 is specified as a general example and when in operation the element would reference an actual business monitor element implementation.

Figure 7:
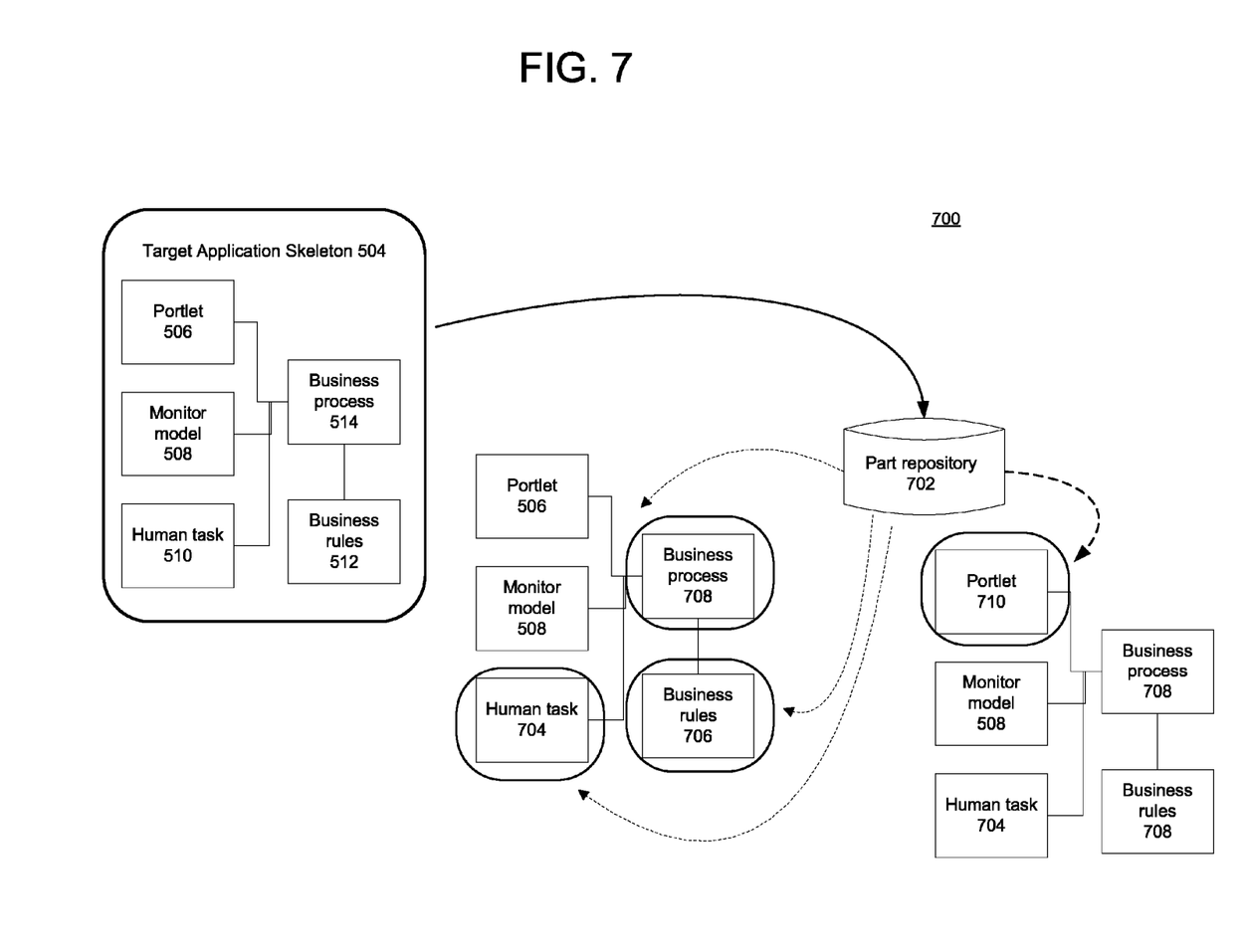
FIG. 7; is a block diagram of a process of determining parts of a target application using the target application skeleton of FIG. 5 in accordance with various embodiments of the disclosure.

With reference to FIG. 7 a block diagram of a process of determining parts of a target application using the target application skeleton of FIG. 5 in accordance with various embodiments of the disclosure is presented. Process 700 is an example of using target application skeleton 504 of FIG. 5 to locate parts to create a target application.

Process 500 of FIG. 5 provided a list of part types in the form of target application skeleton 504. Using this information part repository 702 is searched for applications having parts that match the required types. The search typically identifies a subset of the applications in the repository because most target applications do not contain all available parts in part repository 702. The search process may require more than one iteration to resolve the needs of the target application depending upon the degree to which the parts match the required types. For example in a first pass, a search using a best match criterion is performed to identify entries that match most part types of the list of part types such as human task 704, business rules 706 and business process 708.

A subsequent pass may be required to ensure product integrations are represented in the target application. Another search criteria based on an integration relationship is performed for those parts not covered by the initial search using a best match criterion, such as portlet 710 and monitor model 508. Product integrations are represented by lines between the logical components in the topology diagram as shown in FIG. 4. A determination is made as to whether the applicable target applications have the proper dependencies. A check is performed for a one-to-one correspondence between the lines on the topology diagram and the dependencies between the parts of the target application, as expressed in part repository 702.

Identified entries from parts repository 702 are further examined iteratively during the processing by analyzing metadata relationship sections to locate all related parts, such as those identified through pre-requisites and an integrate with attributes process.

When a target application is determined to have parts matching all required relationships, then the target application is a suitable target application. Any unneeded parts in the target application, for example, parts that do not map to logical components in the topology diagram, should be excluded. Identified entries from parts repository 702 are copied to a local repository from which the target application can be created. Only data of the identified parts based on a predetermined product and operating system version are copied.

When no exact match is found for a logical component, the required parts from a close match may still be useful. Development effort and expertise required may be significantly reduced compared to starting from scratch, since some of the parts required will already be provided as seed components.

Figure 8:
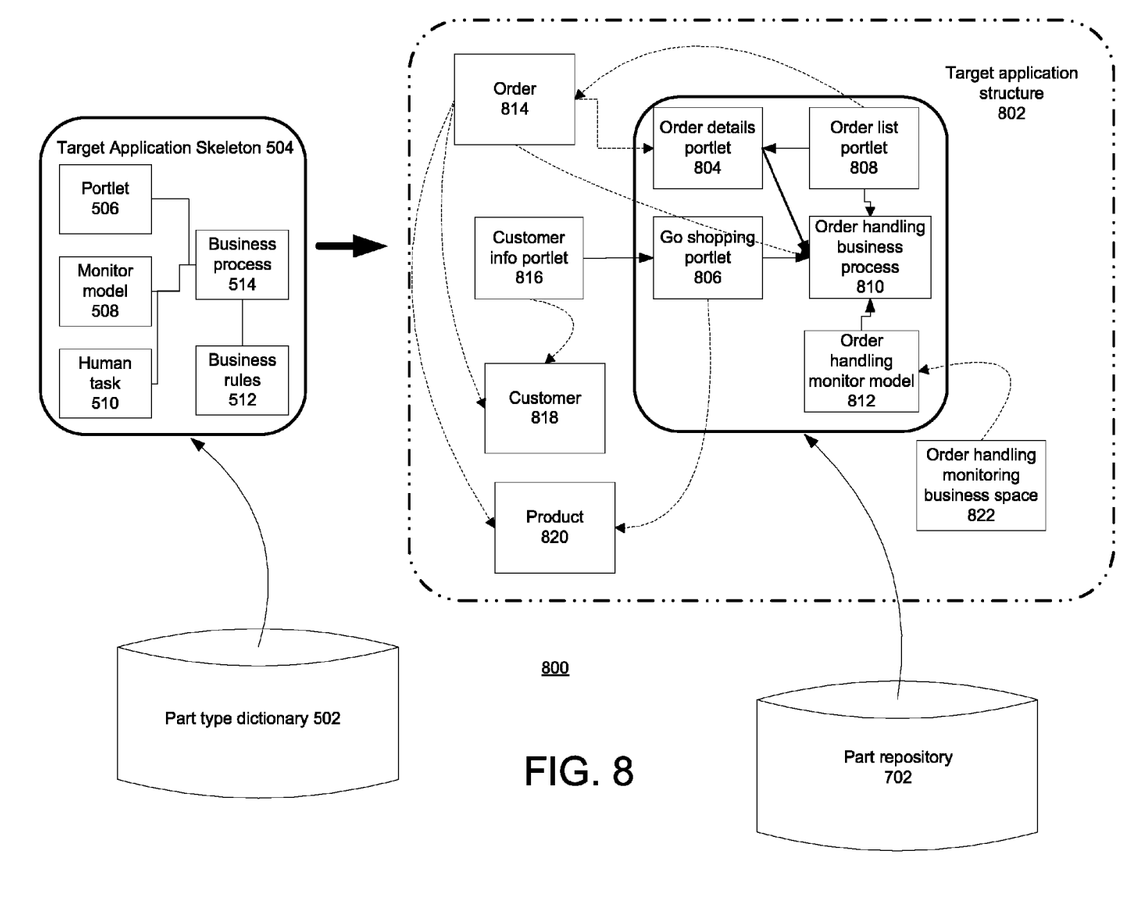
FIG. 8; is a block diagram of a process of determining a target application structure using the process of determining parts of a target application using the target application skeleton of FIG. 7 in accordance with various embodiments of the disclosure.

With reference to FIG. 8 a block diagram of a process of determining a target application structure using the process of determining parts of a target application using the target application skeleton of FIG. 7 in accordance with various embodiments of the disclosure is presented. Process 800 provides an example of processing application skeleton 504 using part type dictionary 502 of process 500 of FIG. 5 and part repository 702 of process 700 of FIG. 7 to generate target application structure 802.

In the illustrated process of FIG. 8, target application skeleton 504 has been processed to yield target application structure 802. Target application structure 802 includes components comprising order details portlet 804, go shopping portlet 806, order list portlet 808, order handling business process 810 and order handling monitor model 812. Additional structure comprising components of order 814, customer info portlet 816, customer 818, product 820 and order handling monitoring business space 822 are now included within target application structure 802. Additional components may include results of an integrate with relationships process or processing metadata relationship sections to locate related parts in process 700 using parts repository 702.

Figure 9:
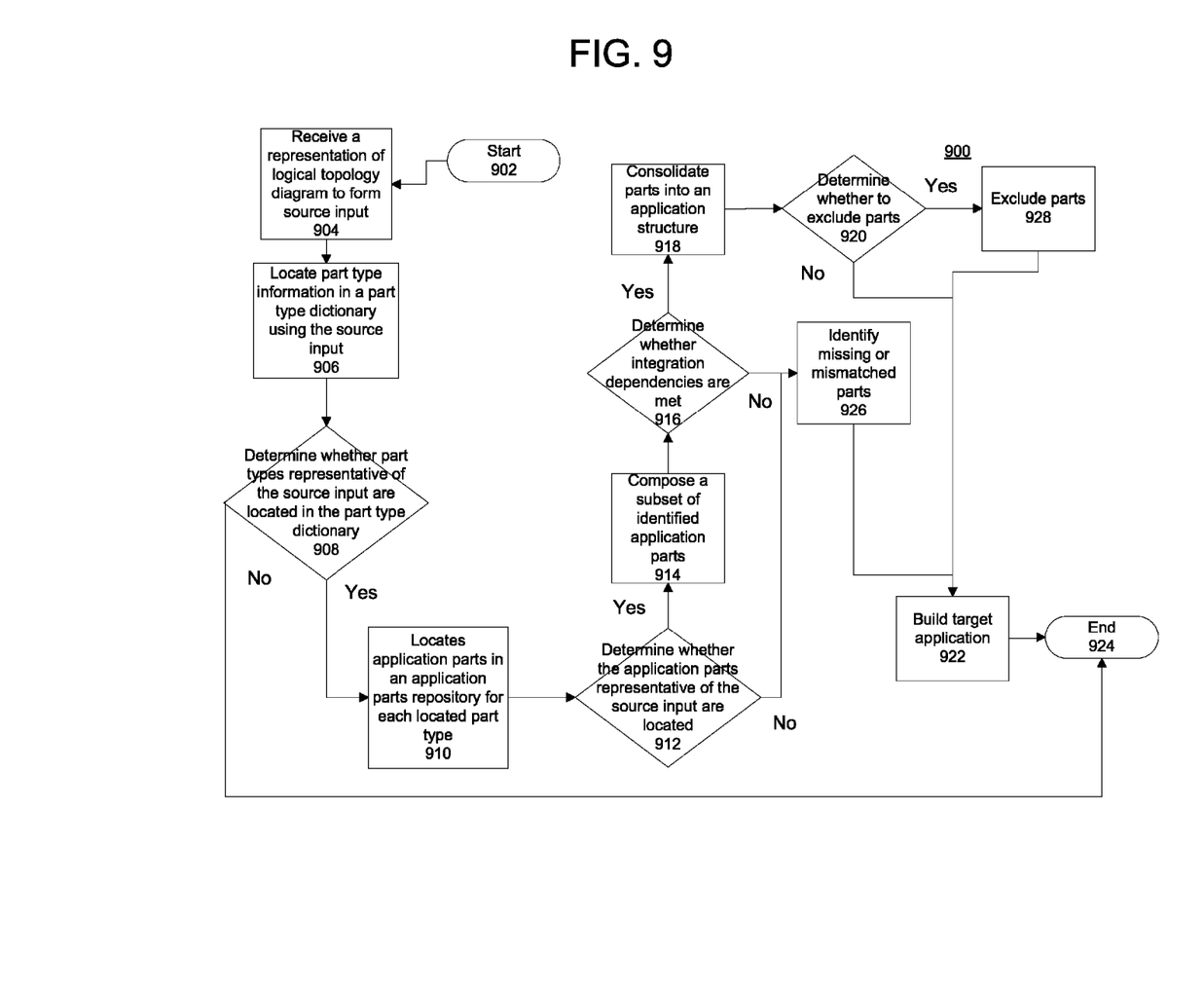
FIG. 9 is a flowchart of a process of determining a target application structure in accordance with one embodiment of the disclosure.

With reference to FIG. 9 a flowchart of a process of determining a target application structure in accordance with one embodiment of the disclosure is presented. Process 900 is an example of a process using system 300 of FIG. 3.

Process 900 starts (step 902) and receives a representation of logical topology diagram to form source input (step 904). The representation may be in the form of a set of extensible markup language statements (XML) or other programming language suitable for describing and processing architectural characteristics of applications. Process 900 locates part type information in a part type dictionary using the source input (step 906).

Process 900 determines whether part types representative of the source input are located in the part type dictionary (step 908). When a determination is made that part types representative of the source input are located in the part type dictionary, a "yes" response is received. When a determination is made that part types representative of the source input are not located in the part type dictionary, a "no" response is received.

When a "no" result is obtained in step 908, process 900 terminates (step 924). When a "yes" result is obtained in step 908, process 900 locates application parts in an application parts repository for each located part type (step 910).

Process 900 determines whether the application parts representative of the source input are located (step 912). When a determination is made that the application parts representative of the source input are located, a "yes" result is obtained. When a determination is made that the application parts representative of the source input are not located, a "no" result is obtained.

When a "yes" result is obtained in step 912 process 900 composes a subset of identified parts (step 914). A subset of the application parts available in the parts repository is typically identified because a target application would rarely require all parts available in the repository. Process 900 determines whether integration dependencies are met (step 916). Integration dependencies are typically described using metadata for respective application parts maintained in the parts repository or obtained from relationships specified in the application logical topology diagram. When a determination is made that integration dependencies are met, a "yes" result is obtained. When a determination is made that integration dependencies are not met, a "no" result is obtained.

When a "yes" result is obtained in step 916, process 900 consolidates parts into an application structure (step 918). Process 900 determines whether to exclude parts (step 920). Any unneeded parts in the target application, for example, parts that do not map to logical components in the topology diagram, should be excluded. When a determination is made that parts are to be excluded, a "yes" result is obtained in step 920. When a determination is made that parts are not to be excluded, a "no" result is obtained in step 920. When a "no" result is obtained in step 920 process 900 builds a target application (step 922) and terminates thereafter (step 924). Building may include operations comprising collecting identified parts in a single location or compilation of collected parts.

When a "yes" result is obtained in step 920, process 900 excludes parts (step 928). For example, parts identified that do not map to logical components in the topology diagram, are excluded. Process 900 builds a target application (step 922) and terminates thereafter (step 924). Building the target application may produce an application, which is ready to run or an application that requires further processing. Further processing may include configuration changes or integration with other existing components.

Returning to step 912, when a "no" result is obtained process 900 performs step 926 as before. Parts identified as missing from the search of the part type dictionary or parts repository may be obtained from other sources outside of the currently described process or developed locally. A notification of missing parts may be provided to a requester.

Returning to step 916, when a "no" result is obtained process 900 identifies missing or mismatched parts (step 926) as previously stated. Process 900 performs step 922 as before and terminates thereafter (step 924).

Thus is presented in one embodiment, a computer-implemented process for target application creation receives a representation of a logical topology diagram for an application architecture to form a source input, locates part type information in a part type dictionary using the source input, locates application parts in an application parts repository for each located part type and composes a subset of identified parts. The computer-implemented process further determines whether integration dependencies are met and responsive to a determination that integration dependencies are met, consolidates parts into an application structure, determines whether to exclude parts and responsive to a determination to not exclude parts, builds a target application.

Illustrative embodiments provide a capability to programmatically read an architecture, as described by a software information technology architect, and generate a target application directly from the architecture documentation, eliminating the tedium and potential errors introduced in the previously used manual process.

For example, a disclosed process uses an architecture diagram, known as a logical topology, to derive what parts and interactions between the parts is required to demonstrate the business value of a proposed software product to a client. The process enables an architect or other user to prove the business value of a proposed target software product to a client quickly and reliably The flowchart and block diagrams in the figures illustrate the architecture, functionality and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for target application creation, the computer-implemented process comprising:
   receiving a representation of a logical topology diagram for an application architecture to form a source input;
   locating part type information in a part type dictionary using the source input;
   locating application parts in an application parts repository for each located part type;
   composing a subset of identified parts;
   determining whether integration dependencies of the subset of identified parts are met;
   responsive to a determination that the integration dependencies are met, consolidating parts into a first application structure;
   determining whether to exclude parts from the first application structure;
   responsive to a determination to exclude parts, excluding the parts from the first application structure to create a second application structure; and
   building a target application based on the second application structure.

2. The computer-implemented process of claim 1 wherein locating application parts in an application parts repository for each located part type further comprises:
   determining whether part types representative of the source input are located in the part type dictionary; and
   responsive to a determination that part types representative of the source input are not located in the part type dictionary, terminating said computer-implemented process.

3. The computer-implemented process of claim 1 wherein composing a subset of identified parts further comprises:
   determining whether application parts, representative of the source input are located in said application parts repository and responsive to a determination that the application parts representative of the source input are not located in said application parts repository, identifying required missing parts.

4. The computer-implemented process of claim 1, wherein the integration dependencies are described using metadata maintained in the parts repository for each of the subset of identified parts, and wherein determining whether the integration dependencies are met further comprises:
   responsive to a determination that the integration dependencies are not met, identifying responsive to a determination that integration dependencies are not met, identifying one or more missing or mismatched parts; and
   in response to identifying the one or more missing or mismatched parts, determining one or more closest matches in the application parts repository for seed parts in a development effort to create a suitable developed part for each of the one or more missing or mismatched parts.

5. The computer-implemented process of claim 1 wherein determining whether to exclude parts further comprises:
   identifying the parts that do not map to logical components in the topology diagram; and
   responsive to a determination to exclude parts, excluding the parts that do not map to the logical components;
   wherein the building of the target application comprises building the target application from the subset of identified parts less the parts that do not map to the logical components.

6. The computer-implemented process of claim 1, wherein the logical topology diagram comprises a plurality of logical components, and wherein receiving the representation of the logical topology diagram for an application architecture to form a source input further comprises:
   receiving a source input comprising the representation of the logical topology diagram to form a received topology diagram; and
   transforming the received topology diagram into an XML-based source input.

7. The computer-implemented process of claim 1 wherein the application parts repository comprises a set of relationships between logical components and respective infrastructure products to form a logical component and product pair suitable to locate a part type within the application parts repository.

8. A computer program product for target application creation, the computer program product comprising:
a non-transitory computer recordable-type media containing computer executable program code stored thereon, the computer executable program code comprising:
computer executable program code for receiving a representation of a logical topology diagram for an application architecture to form a source input;
computer executable program code for locating part type information in a part type dictionary using the source input;
computer executable program code for locating application parts in an application parts repository for each located part type;
computer executable program code for composing a subset of identified parts;
computer executable program code for determining whether integration dependencies are met;
computer executable program code responsive to a determination that the integration dependencies are met, for consolidating parts into a first application structure;
computer executable program code for determining whether to exclude parts from the first application structure; and
computer executable program code responsive to a determination to exclude parts, excluding the parts from the first application structure to create a second application structure; and
computer executable program code for building a target application based on the second application structure.

9. The computer program product of claim 8 wherein computer executable program code for locating application parts in an application parts repository for each located part type further comprises:
computer executable program code for determining whether part types representative of the source input are located in the part type dictionary; and
computer executable program code responsive to a determination that part types representative of the source input are not located in the part type dictionary, for terminating.

10. The computer program product of claim 8 wherein computer executable program code for composing a subset of identified parts further comprises:
computer executable program code for determining whether the application parts representative of the source input are located; and
computer executable program code responsive to a determination that the application parts representative of the source input are not located, for identifying required missing parts.

11. The computer program product of claim 8, wherein the integration dependencies are described using metadata maintained in the parts repository for each of the subset of identified parts, and wherein computer executable program code for determining whether the integration dependencies are met further comprises:
computer executable program code responsive to a determination that the integration dependencies are not met, for identifying missing or responsive to a determination that integration dependencies are not met, identifying one or more missing or mismatched parts; and
computer executable program code responsive to identifying the one or more missing or mismatched parts, for determining one or more closest matches in the application parts repository for seed parts in a development effort to create a suitable developed part for each of the one or more missing or mismatched parts.

12. The computer program product of claim 8 wherein computer executable program code for determining whether to exclude parts identifies the parts that do not map to logical components in the topology diagram, the computer executable program code further comprising:
computer executable program code responsive to a determination to exclude parts, for excluding the parts that do not map to the logical components;
wherein the computer executable program code for building a target application builds the target application from the subset of identified parts less the parts that do not map to the logical components.

13. The computer program product of claim 8, wherein the logical topology diagram comprises a plurality of logical components, and wherein computer executable program code for receiving the representation of the logical topology diagram for an application architecture to form a source input further comprises:
computer executable program code for receiving a source input comprising the representation of the logical topology diagram to form a received topology diagram; and
computer executable program code for transforming the received topology diagram into an XML-based source input.

14. The computer program product of claim 8 wherein the application parts repository comprises a set of relationships between logical components and respective infrastructure products to form a logical component and product pair suitable to locate a part type within the application parts repository.

15. An apparatus for target application creation, the apparatus comprising:
a communications fabric;
a memory connected to the communications fabric, wherein the memory contains computer executable program code;
a communications unit connected to the communications fabric;
an input/output unit connected to the communications fabric;
a display connected to the communications fabric; and
a processor unit connected to the communications fabric, wherein the processor unit executes the computer executable program code to direct the apparatus to:
receive a representation of a logical topology diagram for an application architecture to form a source input;
locate part type information in a part type dictionary using the source input;
locate application parts in an application parts repository for each located part type;
compose a subset of identified parts;
determine whether integration dependencies are met;
responsive to a determination that the integration dependencies are met, consolidate parts into a first application structure;
determine whether to exclude parts from the first application structure;
responsive to a defermination to exclude parts, excluding the parts from the first application structure to create a second application structure; and build a target application based on the second application structure.

16. The apparatus of claim 15 wherein the processor unit executes the computer executable program code to compose a subset of identified parts further directs the apparatus to:
    determine whether the application parts representative of the source input are located; and
    responsive to a determination that the application parts representative of the source input are not located, identify required missing parts.

17. The apparatus of claim 15, wherein the integration dependencies are described using metadata maintained in the parts repository for each of the subset of identified parts, and wherein the processor unit executes the computer executable program code to determine whether the integration dependencies are met further directs the apparatus to:
    responsive to a determination that the integration dependencies are not met, identify one or more missing or mismatched parts; and
    in response to identifying the one or more missing or mismatched parts, determining one or more closest matches in the application parts repository for seed parts in a development effort to create a suitable developed part for each of the one or more missing or mismatched parts.

18. The apparatus of claim 15 wherein the processor unit executes the computer executable program code to determine whether to exclude parts identifying the parts that do not map to logical components in the topology diagram, the computer executable program code further directing the apparatus to:
    responsive to a determination to exclude parts, exclude the parts that do not map to the logical components; and
    wherein the building of the target application comprises building the target application from the subset of identified parts less the parts that do not map to the logical components.

19. The apparatus of claim 15, wherein the logical topology diagram comprises a plurality of logical components, and wherein the processor unit executes the computer executable program code to receive the representation of the logical topology diagram for an application architecture to form a source input further directs the apparatus to:
    receive a source input comprising the representation of the logical topology diagram to form a received topology diagram; and
    transform the received topology diagram into an XML-based source input.

20. The apparatus of claim 15 wherein the application parts repository comprises a set of relationships between logical components and respective infrastructure products to form a logical component and product pair suitable to locate a part type within the application parts repository.

* * * * *